(12) United States Patent
Nishikawa et al.

(10) Patent No.: US 9,863,763 B2
(45) Date of Patent: Jan. 9, 2018

(54) METHOD FOR ADJUSTING VOLUME OF COMBUSTION CHAMBER OF ENGINE

(71) Applicant: DMG Mori Seiki Co., Ltd., Yamatokoriyama-shi, Nara (JP)

(72) Inventors: Shizuo Nishikawa, Yamatokoriyama (JP); Hiroki Nakao, Yamatokoriyama (JP)

(73) Assignee: DMG Mori Seiki Co., Ltd., Nara (JP)

( * ) Notice: Subject to any disclaimer, the term of this patent is extended or adjusted under 35 U.S.C. 154(b) by 284 days.

(21) Appl. No.: 14/645,691

(22) Filed: Mar. 12, 2015

(65) Prior Publication Data

US 2015/0276393 A1 Oct. 1, 2015

(30) Foreign Application Priority Data

Mar. 25, 2014 (JP) ................................. 2014-062491

(51) Int. Cl.
*G01B 11/28* (2006.01)
*B23C 3/00* (2006.01)
(Continued)

(52) U.S. Cl.
CPC .............. *G01B 11/285* (2013.01); *B23C 3/00* (2013.01); *G05B 19/4097* (2013.01);
(Continued)

(58) Field of Classification Search
CPC ........ B23C 3/00; B23C 2215/242; F02F 1/24; F02F 2200/06; Y10T 29/4927;
(Continued)

(56) References Cited

U.S. PATENT DOCUMENTS 5,517,311 A * 5/1996 Takeuchi ........... G01B 11/2518
29/888.06
2011/0296684 A1* 12/2011 Yamamoto .............. B23P 13/02
29/888.06

FOREIGN PATENT DOCUMENTS

JP 6330810 A 11/1994
JP EP 0773350 A1 * 5/1997 ............... F01L 3/22
JP 2011256730 A 12/2011

OTHER PUBLICATIONS

Japanese Office Action dated Mar. 27, 2015 from corresponding Japanese Patent Application No. 2014-062490, 2 pages.

* cited by examiner

*Primary Examiner* — Jacob Cigna
*Assistant Examiner* — Lee A Holly
(74) *Attorney, Agent, or Firm* — Fish & Richardson P.C.

(57) ABSTRACT

In order to adjust the volume of the combustion chamber with high accuracy, a cylinder head 200 includes a recess 204 constituting part of the combustion chamber of the engine and a mating surface for a cylinder block. The recess 204 includes a plurality of openings to which a plurality of specific members are attached respectively. The mating surface 202 is formed to have a cutting stock with respect to three-dimensional shape data of the cylinder head 200 designed to have a target combustion chamber volume. The adjusting method further comprises measuring the surface shape of the recess and the shape of the mating surface around the recess by successively changing the irradiation position of a laser beam using a line laser displacement meter. The adjusting method further comprises removing data of regions equivalent to the plurality of openings from measurement data by comparing the measurement data obtained by the line laser displacement meter with the three-dimensional shape data. The adjusting method still
(Continued)

further comprises: calculating the volume of the recess 204 based on the measurement data from which the regions equivalent to the plurality of openings are removed; and deciding the cutting amount of the mating surface 202 by comparing the calculated volume of the recess 204 with a volume of the recess 204 based on the three-dimensional shape data.

2 Claims, 19 Drawing Sheets

(51) Int. Cl.
*G05B 19/4097* (2006.01)
*F02F 1/24* (2006.01)
(52) U.S. Cl.
CPC ........... *B23C 2215/242* (2013.01); *F02F 1/24* (2013.01); *G05B 2219/37275* (2013.01); *Y02P 90/265* (2015.11); *Y10T 29/4927* (2015.01)
(58) Field of Classification Search
CPC ........ B23P 13/02; B23P 6/02; G01B 11/2518; F02D 2041/001; G05B 19/4097; G05B 2219/37275; B01B 11/285
See application file for complete search history.

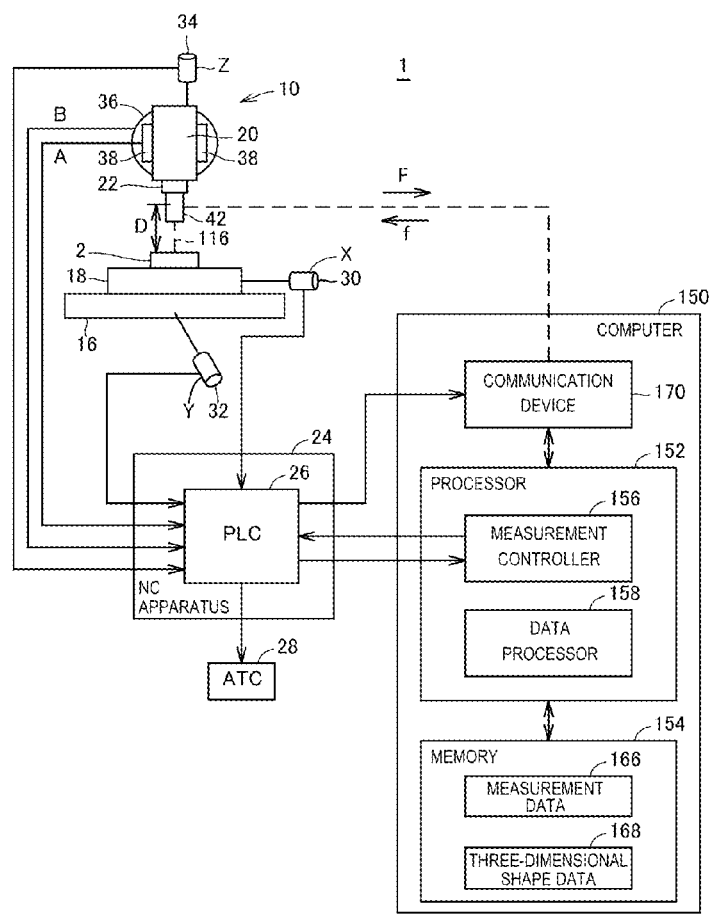
F I G. 2

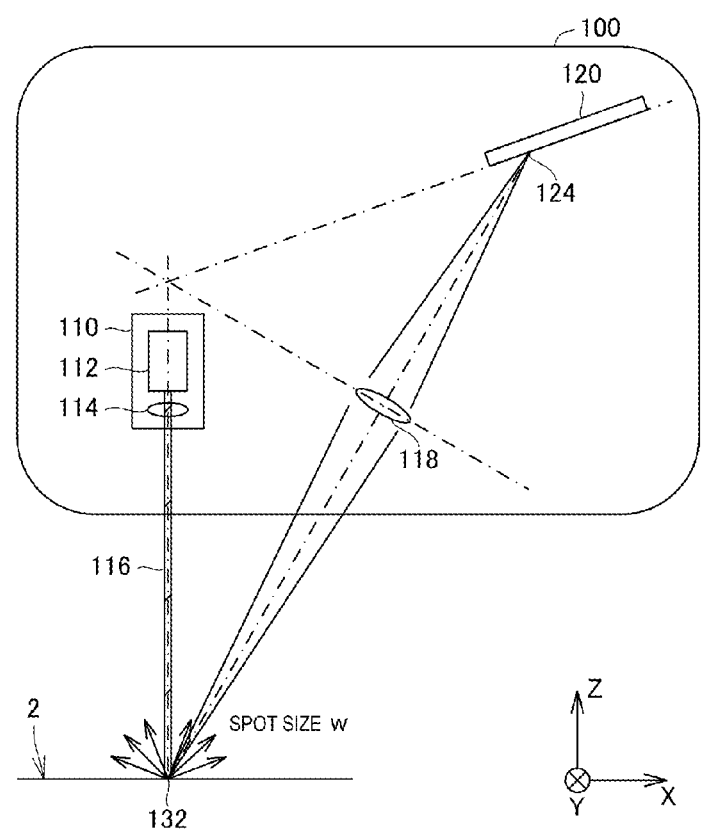
F I G. 3

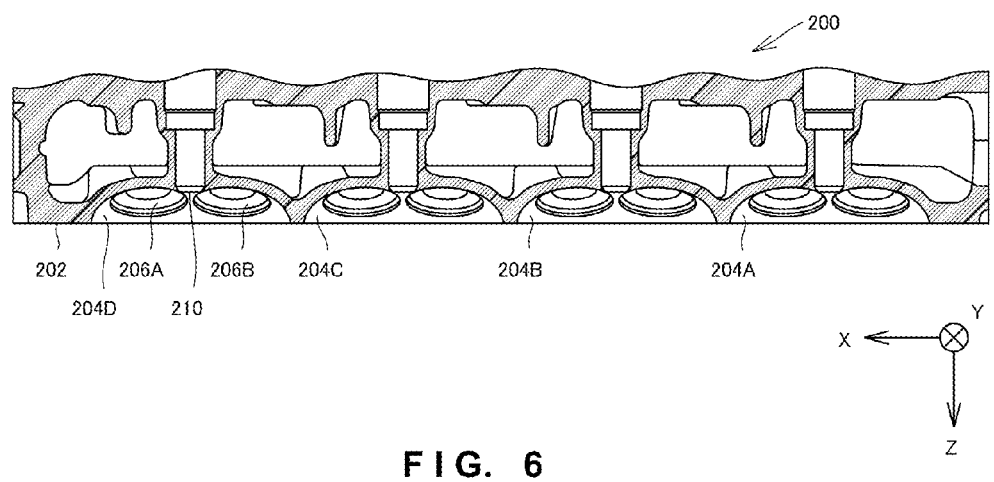
F I G. 6

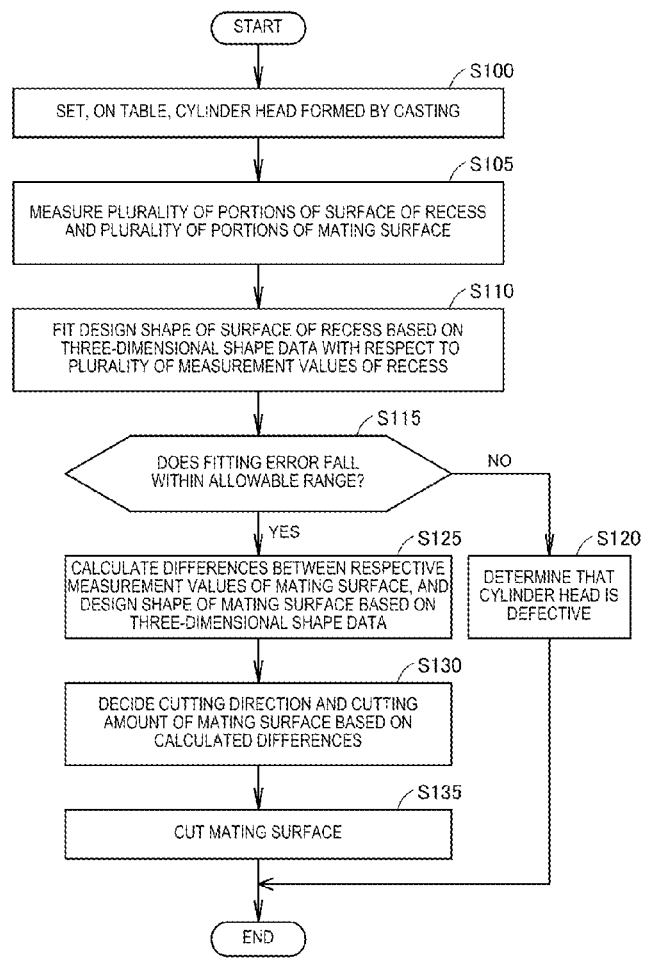
F I G. 8

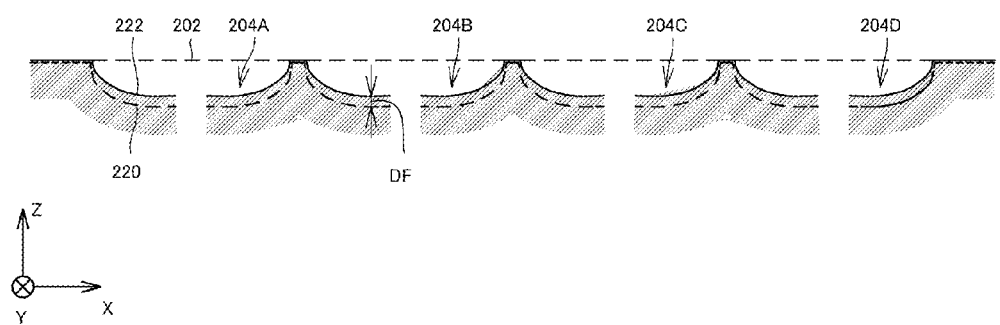
F I G. 9A

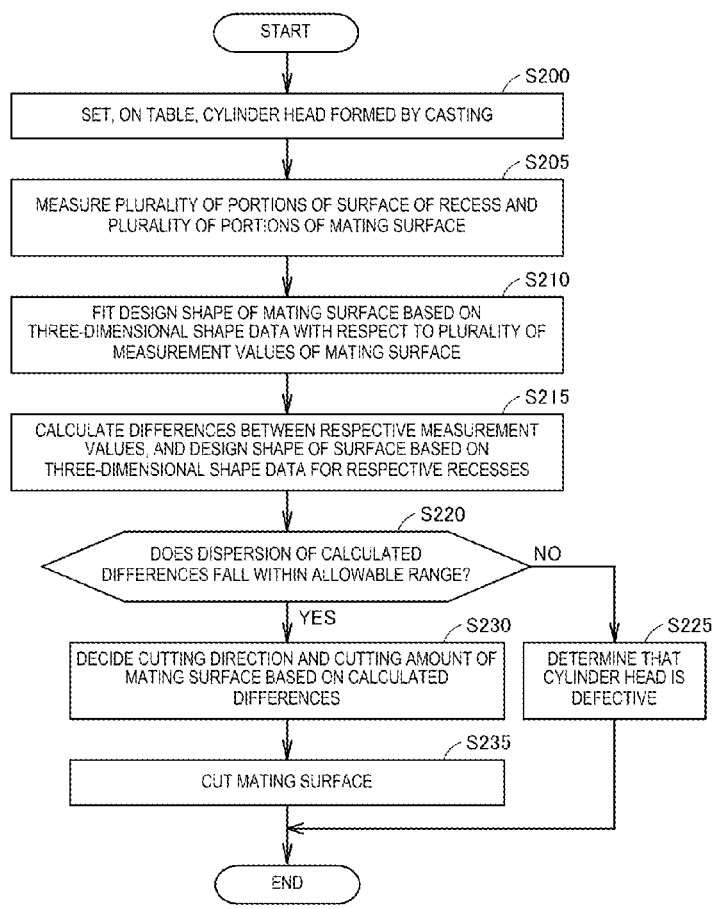
F I G. 10

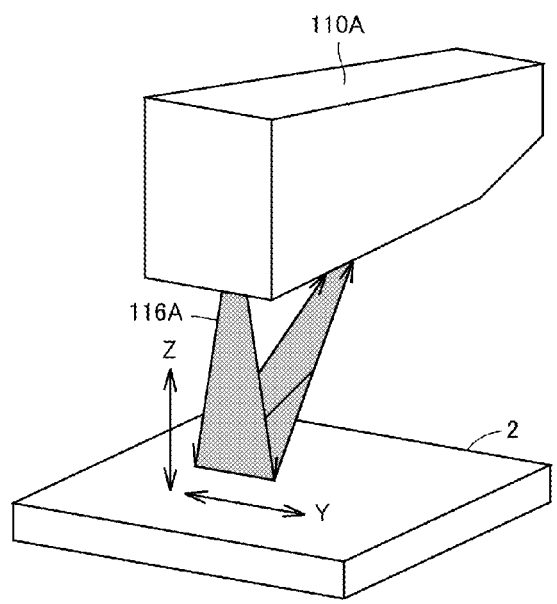
F I G. 11A

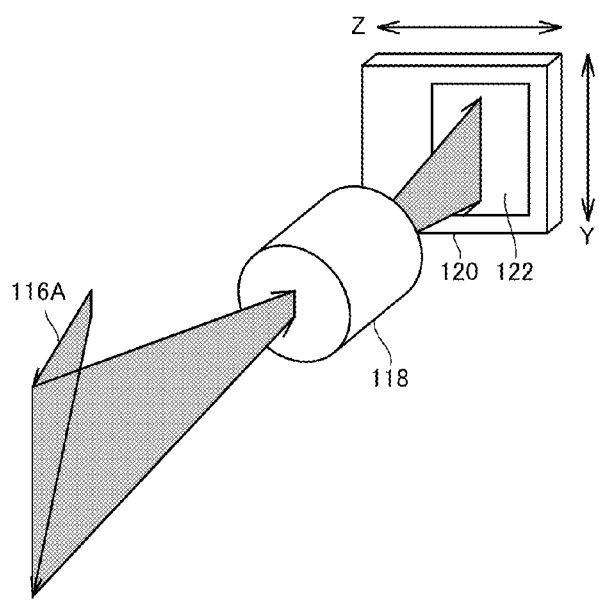
F I G. 11B

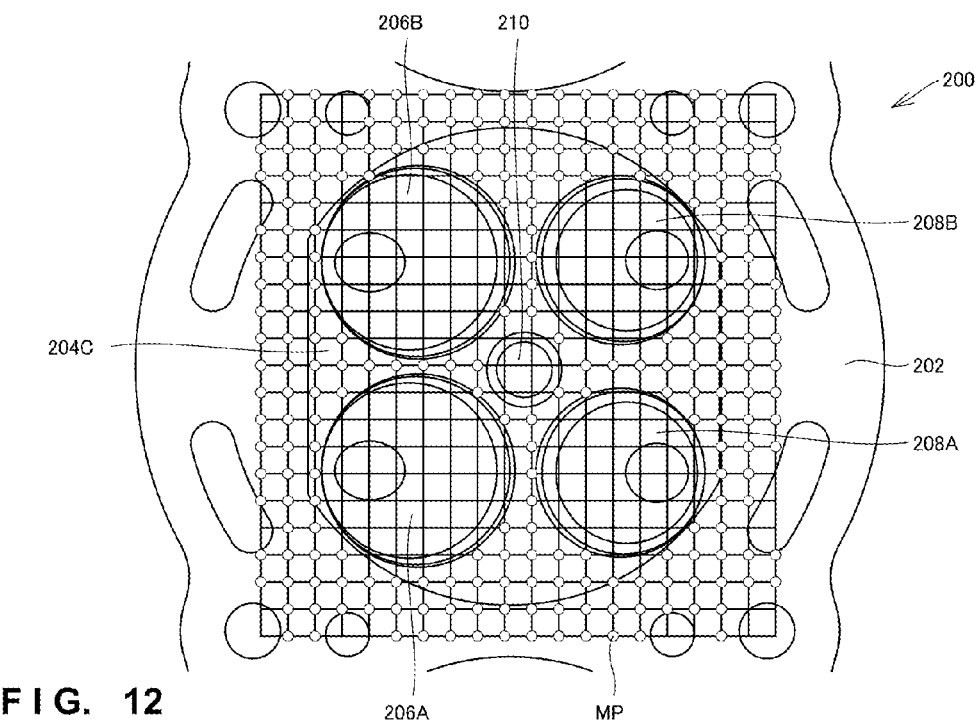
F I G. 12

METHOD FOR ADJUSTING VOLUME OF COMBUSTION CHAMBER OF ENGINE

BACKGROUND OF THE INVENTION

Field of the Invention

The present invention relates to a method for adjusting the volume of the combustion chamber of an engine.

Description of the Related Art

The volume of a combustion chamber in art automobile engine greatly influences the combustion characteristics of fuel and the performance of the engine. Making the volume of the combustion chamber fall within a predetermined range is therefore necessary. More specifically, the volume of the recess of a cylinder head constituting part of the combustion chamber is measured, and a mating surface for a cylinder block or the recess is machined in accordance with the measurement result. By this machining process, the volume of the combustion chamber can be adjusted.

As a conventional method of obtaining the volume of the recess of the cylinder head, a method of filling the valve hole of a cast cylinder head with clay or the like, pouring kerosene into the recess of the cylinder head, and obtaining the volume of the recess from the volume of the kerosene is often used. However, this method is inefficient because of the intervention of manual work.

Japanese Patent Laid-Open No. 2011-256730 discloses a technique of, when forming a cylinder head by casting, setting a flat reference surface at the top of the recess of the cylinder head, and measuring a distance between the mating surface and the reference surface to decide a cutting amount.

However, the method described in the above literature only measures the distance between one point of the reference surface and the mating surface, so the accuracy is not so high.

SUMMARY OF THE INVENTION

The present invention has been made in consideration of the above-described problems, and enables to solve the problems of the related art.

One aspect of the present invention provides a method for adjusting a volume of a combustion chamber of an engine, comprising:

preparing a cylinder head formed by casting, the cylinder head including a recess constituting part of the combustion chamber of the engine and a mating surface for a cylinder block, and the mating surface being formed to have a cutting stock with respect to three-dimensional shape data of the cylinder head designed to have a target combustion chamber volume, the adjusting method further comprising:

measuring a plurality of portions of a surface of the recess and a plurality of portions of the mating surface by using a displacement meter;

calculating differences between respective measurement values of the mating surface, and a design shape of the mating surface based on the three-dimensional shape data in a state in which the design shape of the surface of the recess based on the three-dimensional shape data is fitted with respect to a plurality of measurement values of the recess; and deciding a cutting amount based on the calculated differences and cutting the mating surface by the decided cutting amount.

Another aspect of the present invention provides a method for adjusting a volume of a combustion chamber of an engine, comprising:

preparing a cylinder head formed by casting, the cylinder head including a recess constituting part of the combustion chamber of the engine and a mating surface for a cylinder block, and the mating surface being formed to have a cutting stock with respect to three-dimensional shape data of the cylinder head designed to have a target combustion chamber volume, the adjusting method further comprising:

measuring a plurality of portions of a surface of the recess and a plurality of portions of the mating surface by using a displacement meter;

calculating differences between respective measurement values of the recess, and a design shape of the surface of the recess based on the three-dimensional shape data in a state in which the design shape of the mating surface based on the three-dimensional shape data is fitted with respect to a plurality of measurement values of the mating surface; and deciding a cutting amount based on the calculated differences and cutting the mating surface by the decided cutting amount.

BRIEF DESCRIPTION OF THE DRAWINGS

FIG. 2 is a block diagram showing the functional arrangement of a part regarding surface shape measurement in the machine tool according to the first embodiment of the present invention;

FIG. 3 is a view schematically showing the arrangement of a laser displacement meter according to the first embodiment of the present invention;

FIG. 6 is a partial sectional view taken along a cutting line VI-VI in FIG. 4;

FIG. 8 is a flowchart showing procedures of adjusting the volume of the combustion chamber of an engine according to the first embodiment of the present invention;

FIGS. 9A to 9C are sectional views for explaining a method of deciding the cutting amount and cutting direction of the mating surface of a cylinder head according to the second embodiment of the present invention;

FIG. 10 is a flowchart showing procedures of adjusting the volume of the combustion chamber of an engine according to the second embodiment of the present invention;

FIGS. 11A and 11B are views for explaining the measurement principle of a line laser displacement meter;

FIG. 12 is a view for explaining the measurement portions of the surface of a cylinder head by the line laser displacement meter;

DESCRIPTION OF THE EMBODIMENTS

A preferred embodiment(s) of the present invention will now be described in detail with reference to the drawings, it should be noted that the relative arrangement of the components, the numerical expressions and numerical values set forth in these embodiments do not limit the scope of the present invention unless it is specifically stated otherwise.

First Embodiment

Example of Arrangement of Machine Tool Including Laser Displacement Meter

Figure 1:
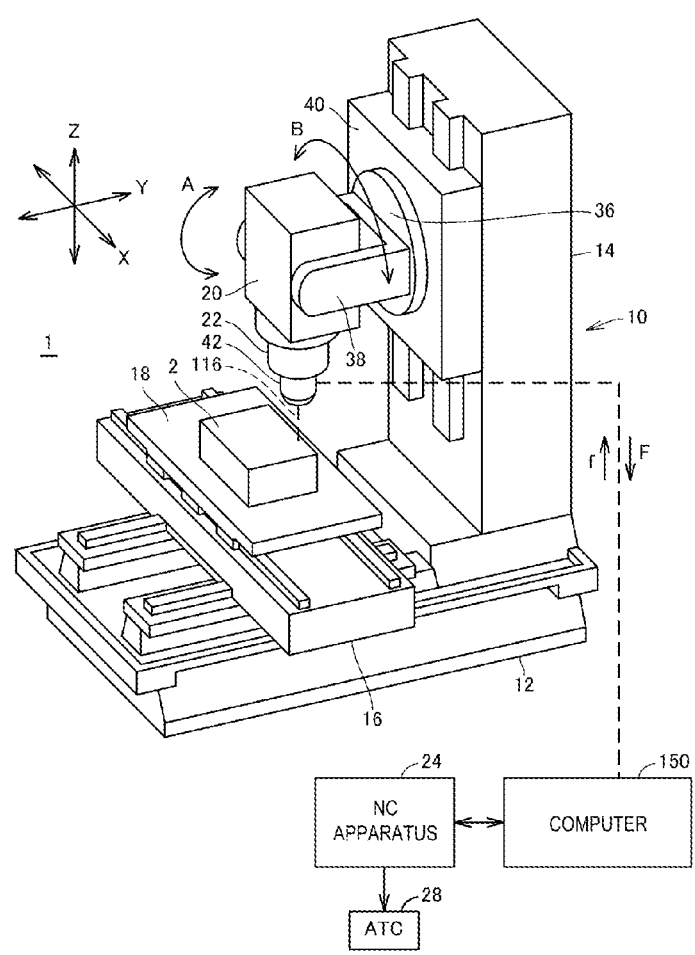
FIG. 1 is a perspective view schematically showing an example of a machine tool including a displacement meter according to the first embodiment of the present invention.

FIG. 1 is a perspective view schematically showing an example of a machine tool including a displacement meter used in the first embodiment of the present invention. A case in which the machine tool is a vertical machining center will be explained below, but the machine tool may be of another type such as a horizontal machining center. Further, a non-contact displacement meter using a laser will be exemplified as the displacement meter, but the displacement meter may be of a contact type.

Referring to FIG. 1, a machine tool 1 includes a processing apparatus 10, an NC (Numerical Control) apparatus 24, an ATC (Automatic Tool Changer) 28, and a computer 150.

The machining apparatus 10 includes a bed 12, a column 14 set on the bed 12, a spindle head 20 including a spindle 22, and a saddle 16 including a table 18.

The column 14 is set on the bed 12, and includes a back support 40 movable in the vertical direction (Z-axis direction). A B-axis rotating mechanism 36 and an A-axis rotating mechanism 38 are attached to the back support 40.

The spindle head 20 is supported by the front surface of the column 14 via the back support 40, the B-axis rotating mechanism 36, and the A-axis rotating mechanism 38, is movable in the vertical direction (Z-axis direction), and can be driven to rotate about the A-axis and the B-axis. A tool (not shown) or a measurement head 42 is detachably attached to the distal end of the spindle 22. The spindle 22 is supported by the spindle head 20 so that it can rotate about the central axis line (Z-axis direction).

The measurement head 42 incorporates a laser displacement meter 100, a control circuit and driving battery for the laser displacement meter, and a communication device for performing wireless communication.

The saddle 16 is arranged on the bed 12 and is movable in back and forth horizontal directions (Y-axis directions). The table 18 is arranged on the saddle 16. The table 18 is movable in left and right horizontal directions (X-axis directions). A workpiece 2 (more specifically, a cylinder head) is placed on the table 18.

The machining apparatus 10 is a five-axis machining center that linearly moves the measurement head 42 and the workpiece 2 relatively in three orthogonal axial directions of the X-, Y-, and Z-axes, and has the A- and B-rotation axes. Note that the arrangement of the three orthogonal axes and rotation axes may be different from that in FIG. 1. For example, the driving mechanisms for the three orthogonal axes may be arranged on the side of the spindle head 20, and the rotating mechanisms for the A- and C-axes may be arranged on the table side.

The NC apparatus 24 controls the overall operation of the machining apparatus 10, including control along the three orthogonal axes and two rotation axes mentioned above. The ATC 28 automatically changes the tool and the measurement head 42 from the spindle 22. The NC apparatus 24 controls the ATC 28.

FIG. 2 is a block diagram showing the functional arrangement of a part regarding surface shape measurement in the machine tool of FIG. 1. FIG. 2 shows a Z-axis feed mechanism 34, a Y-axis feed mechanism 32, an X-axis feed mechanism 30, the A-axis rotating mechanism 38, and the B-axis rotating mechanism 36 that are arranged in the machining apparatus 10.

Referring to FIGS. 1 and 2, the Z-axis feed mechanism 34 drives the spindle head 20 supported by the column 14 and moves it in the Z-axis direction. The Y-axis feed mechanism 32 drives the saddle 16 arranged on the bed 12 and moves it in the Y-axis direction. The X-axis feed mechanism 30 drives the table 18 that is placed on the saddle 16 and supports the workpiece 2, and moves the table 18 in the X-axis direction. The NC apparatus 24 controls the Z-axis feed mechanism 34, the Y-axis feed mechanism 32, the X-axis feed mechanism 30, the A-axis rotating mechanism 38, and the B-axis rotating mechanism 36.

The computer 150 includes a processor 152, a memory 154, and a communication device 170 for performing wireless communication with the measurement head 42. The processor 152 functions as a measurement controller 156 and data processor 158 described with reference to FIG. 4 by executing a program stored in the memory 154.

The measurement controller 156 successively changes the relative positional relationship between the measurement head 42 and the workpiece 2 in cooperation with the NC apparatus 24, and a laser beam 116 is scanned along the surface of the workpiece 2. During scanning of the laser beam 116, the measurement controller 156 acquires, as surface shape data of the workpiece 2 from the measurement head 42, displacement data in the direction of height (Z-axis direction) at a plurality of measurement points in the scanning direction of the laser beam 116. Concrete procedures are as follows.

First, under the control of the measurement controller 156, the NC apparatus 24 drives either of the X-axis feed mechanism 30 and Y-axis feed mechanism 32, or at least two axes out of the X-axis feed mechanism 30, Y-axis feed mechanism 32, and Z-axis feed mechanism 34. Accordingly, the NC apparatus 24 successively changes the relative positional relationship between the measurement head 42 and the workpiece 2.

A PLC (Programmable Logic Controller) 26 incorporated in the NC apparatus 24 outputs a trigger signal to the communication device 170 in a predetermined cycle in synchronism with driving of the above-mentioned feed mechanisms. Upon receiving the trigger signal, the communication device 170 transmits a measurement instruction f to the measurement head 42. The measurement head 42 measures a distance D (that is, the displacement of the surface of the work piece 2) from the measurement head 42 to the workpiece 2 in accordance with the measurement instruction f. Data F of the measured distance D is transmitted from the measurement head 42 to the measurement controller 156 via the communication device 170.

Further, the PLC 26 detects position data of the measurement head 42 by acquiring pieces of position information of the X-axis feed mechanism 30, Y-axis feed mechanism 32, and Z-axis feed mechanism 34 in synchronism with the timing of distance measurement by the measurement head 42. The PLC 26 transmits the detected position data of the measurement head 42 to the measurement controller 156.

Based on the position data of the measurement head 42 that has been acquired from the PLC 26, and the data F of the distance D that has been acquired from the measurement head 42, the measurement controller 156 derives displacement data in the direction of height (Z-axis direction) at the respective measurement points in the scanning direction of the laser beam 116. The displacement data are stored as measurement data 166 in the memory 154. Three-dimensional shape data 168 as design data of the workpiece 2 is further stored in the memory 154.

The processor 152 further functions as the data processor 158 for performing data processing of the measurement data 166.

[Example of Arrangement of Laser Displacement Meter]

FIG. 3 is a view schematically showing the arrangement of the laser displacement meter. Referring to FIG. 3, the laser displacement meter 100 includes a light emitter 110, a condenser lens 118 serving as an optical system, and a linear image sensor 120 serving as a light receiver. The light emitter 110 includes a laser diode 112 and a lens 114.

The laser beam 116 emitted by the laser diode 112 is shaped into almost parallel light through the lens 114, and irradiates the workpiece 2 serving as a measurement target object. A spot size w (to be also referred to as a spot diameter) of the laser beam 116 on the measurement target object is, for example, a diameter of 50 μm.

Light diffused and reflected at the irradiation position to laser spot 132) of the laser beam 116 on the measurement target object 2 is condensed through the condenser lens 118 onto the linear image sensor 120. The distance to the workpiece 2 is calculated by triangulation based on the condensing position on the linear image sensor 120.

The linear image sensor 120 is arranged at an angle based on the Scheimpflug condition. That is, the detection surface of the linear image sensor 120 and the principal plane of the condenser lens 118 cross each other at one straight line. In this arrangement, a plane including the laser beam 116 serves as the object plane. Even if the distance between the measurement target object 2 and the laser displacement meter 100 changes, the laser spot 132 forms an image on the linear image sensor 120 without any blur.

[Example of Structure of Cylinder Head]

Figure 4:
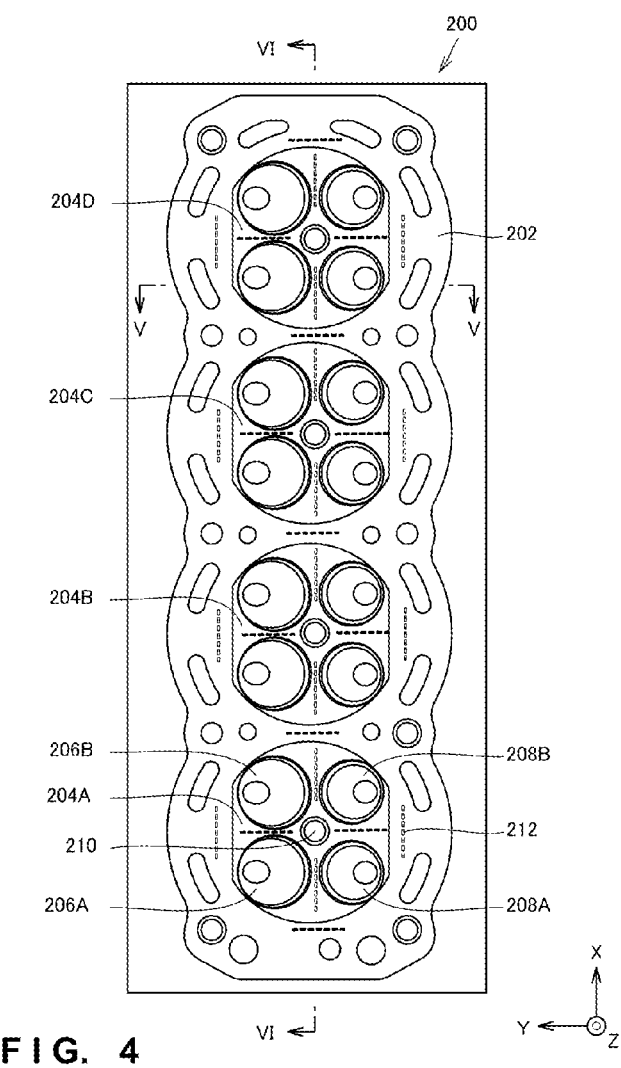
FIG. 4 is a plan view showing the outer appearance of a cylinder head serving as a machining target using the machine tool according to the first embodiment of the present invention.
Figure 5:
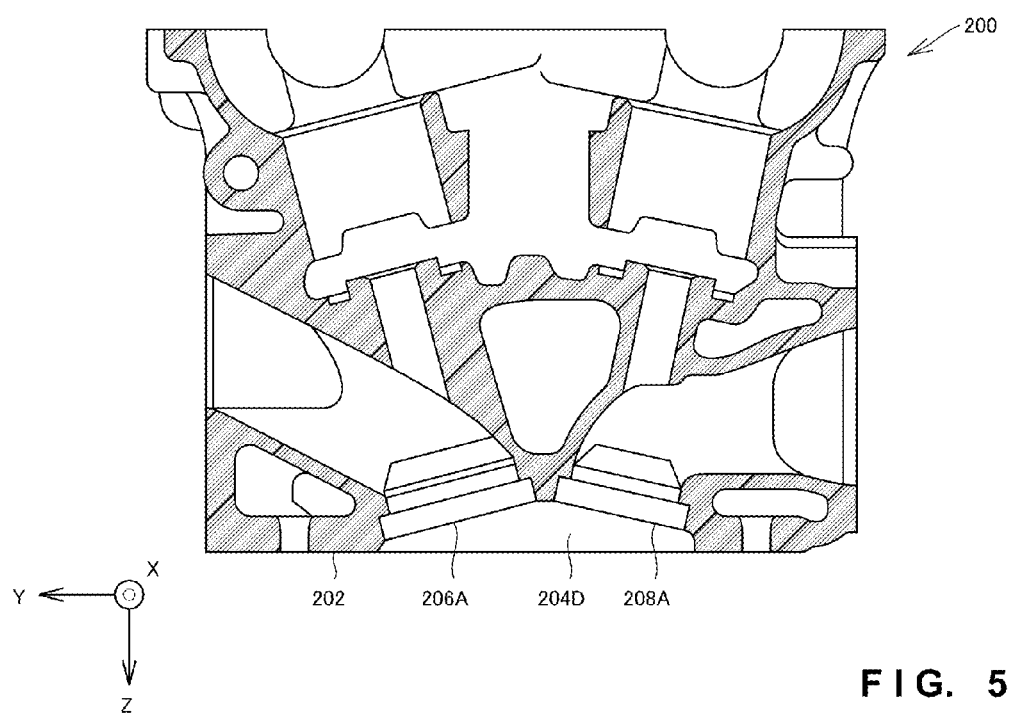
FIG. 5 is a sectional view taken along a cutting line V-V in FIG. 4.

FIG. 4 is a plan view showing the outer appearance of a cylinder head serving as a machining target using the machine tool of FIG. 1. FIG. 5 is a sectional view taken along a cutting line V-V in FIG. 4. FIG. 6 is a partial sectional view taken along a cutting line VI-VI in FIG. 4. FIGS. 4 to 6 show an example of the structure of a cylinder head constituting a four-cylinder engine. The cylinder head is formed by casting and then partially cut by using a machining center as shown in FIG. 1.

Referring to FIGS. 4 to 6, a cylinder head 200 includes four recesses 204A to 204D (to be generically referred to as recesses 204) forming part of a combustion chamber for respective cylinders, and a mating surface 202 for a cylinder block.

The respective recesses 204 have the same arrangement, and constitute the combustion chamber together with the inner wall surfaces of corresponding cylinder bores and piston top surfaces. Openings 206A and 206B for intake ports, openings 208A and 208B for exhaust ports, and openings 210 for spark plugs are formed in the respective recesses 204. Intake valves are attached to the openings 206A and 206B for the intake ports, respectively. Exhaust valves are attached to the openings 208A and 208B for the exhaust ports, respectively. In this specification, the intake valves, the exhaust valves, and the spark plugs will also be referred to as specific members.

The mating surface 202 is formed to have a cutting stock. By cutting the mating surface 202, the volume of each recess 204 can be equalized to a target design value.

[Method for Adjusting Volume of Combustion Chamber]

Referring to FIG. 4, the laser displacement meter measures the surface shape of the cylinder head 200 on the combustion chamber side in order to decide the cutting direction and cutting amount of the mating surface 202. However, a long time is taken for detailed measurement of the surface shapes of the respective recesses 204 and that of the mating surface 202 by using the laser displacement meter 100 having the arrangement in FIG. 3. Thus, in this embodiment, a plurality of portions of the surfaces of the respective recesses 204 and a plurality of portions of the mating surface 202 around the recesses 204 are measured representatively. For example, portions indicated by broken lines in FIG. 4 are measurement portions 212. More specifically, the laser displacement meter 100 measures the surfaces of the respective recesses 204 between port openings and adjacent port openings, and parts of the mating surface 202 around the recesses 204. The obtained measurement data 166 are stored in the memory 154 of the computer 150.

The data processor 158 in FIG. 2 decides the cutting amount and cutting direction of the mating surface 202 by comparing the measurement data 166 with the three-dimensional shape data 168 of the cylinder head designed to have a target combustion chamber volume. This will be explained in detail with reference to the drawings.

Figure 7A:
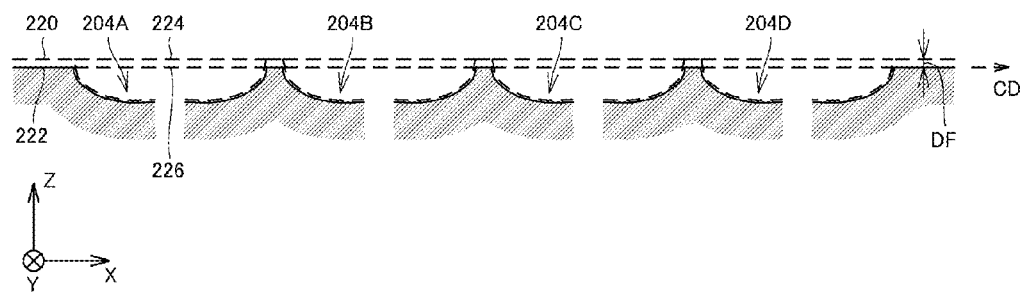
FIGS. 7A to 7C are sectional views for explaining a method of deciding the cutting amount and cutting direction of the mating surface of the cylinder head according to the first embodiment of the present invention.
Figure 7B:
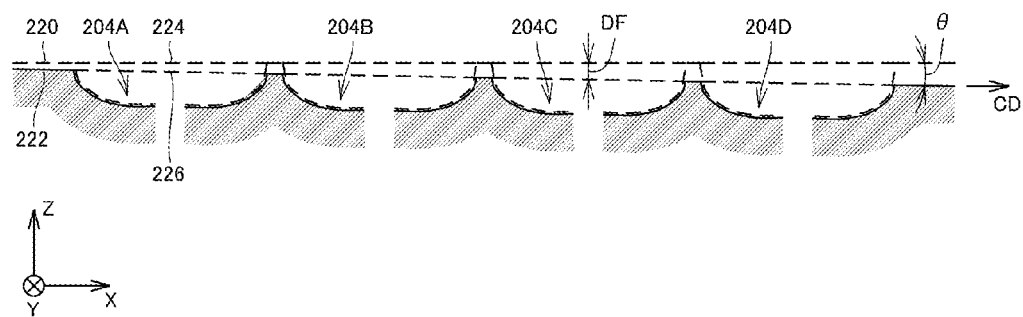
Figure 7C:
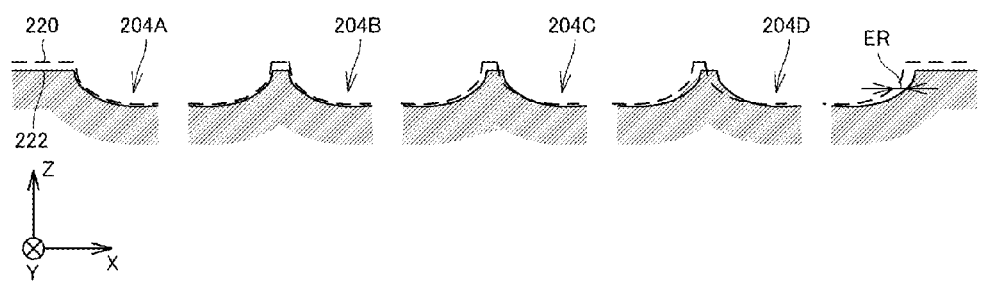

FIGS. 7A to 7C are sectional views for explaining a method of deciding the cutting amount and cutting direction of the mating surface of the cylinder head in the first embodiment. In FIGS. 7A to 7C, a broken line represents a surface shape based on each of measurement values 220, and a solid line represents a design shape 222 based on the three-dimensional shape data 168.

Referring to FIG. 7A, first, the data processor 158 fits the design shapes 222 of the surfaces of the recesses 204A to 204D with respect to the respective measurement values 220 of the recesses 204A to 204D by using the least squares method, maximum likelihood method, or the like. Then, the data processor 158 calculates differences DF between the respective measurement values 220 of the mating surface and the design shape 222 of the mating surface in this fitting state. In the case of FIG. 7A, the differences DF are uniform, so a direction along a plane 226 parallel to a mating surface 224 after casting serves as a cutting direction CD. Cutting amounts are equal to the values of the calculated differences DF, and are uniform at the respective portions of the mating surface.

Referring to FIG. 7B, as a result of performing the same fitting as in FIG. 7A, the obtained differences DF gradually become larger in the array direction of the recesses 204. In this case, a direction along the plane 226 inclined at an angle θ with respect to the mating surface 224 after casting serves as the cutting direction CD, as shown in FIG. 7B. Cutting amounts are decided based on the calculated differences DF, and have different values depending on positions on the mating surface.

In the case of FIG. 7B, if the cutting direction CD is not inclined with respect to the mating surface 224 after casting, the volumes of the recesses 204A to 204D after cutting differ from each other. More specifically, letting Va, Vb, Vc, and Vd be the volumes of the recesses 204A, 204B, 204C, and 204D after cutting, these volumes have a relation of Va<Vb<Vc<Vd. By inclining the cutting direction CD with respect to the mating surface 224 after casting, the volumes of the recesses 204A to 204D after cutting become almost equal, that is, Va=Vb=Vc=Vd.

Referring to FIG. 7C, when a fitting error exceeds a reference value as a result of performing the same fitting as in FIG. 7A, the data processor 158 determines that the cylinder head is a defective. Defective/non-defective determination can be made based on whether differences ER between the respective measurement values 220 of the recess 204D and the design shape 222 of the surface of the recess 204D exceed an allowable range in a state in which the design shape 222 of the surface of the recess 204A is fitted with respect to the respective measurement values 220 of the recess 204A.

[Procedures of Adjusting Volume of Combustion Chamber]

FIG. 8 is a flowchart showing procedures of adjusting the volume of the combustion chamber of an engine in this embodiment. The above description will be summarized with reference to FIGS. 2, 4, and 8.

First, the cylinder head 200 formed by casting is placed on the table 18 of the machine tool 1 (S100). The measurement controller 156 measures a plurality of portions of the surface by the laser displacement meter for the respective recesses 204 of the cylinder head 200, and measures a plurality of portions on the mating surface 202 of the cylinder head 200 by the laser displacement meter (S105). The measurement data 166 are stored in the memory 154.

Then, the data processor 158 fits the design shapes of the surfaces of the respective recesses 204 based on the three-dimensional shape data 168 with respect to the plurality of measurement values of the recesses 204 (S110). At this time, the data processor 158 determines whether the fitting error falls within an allowable range (S115). If the fitting error exceeds the allowable range (NO in S115), the data processor 158 determines that the cylinder head 200 is a defective (S120).

If the fitting error falls within the allowable range (YES in S115), the data processor 158 calculates difference between the respective measurement values of the mating surface 202, and the design shape of the mating surface 202 based on the three-dimensional shape data 168 in the fitting state (S125). The data processor 158 decides the cutting direction of the mating surface 202 based on the tendency of a change of the calculated difference values in the array direction of the recesses 204A to 204D. In addition, the data processor 158 decides cutting amounts at respective positions on the mating surface 202 based on the calculated difference values (S130).

Finally, the computer 150 creates the machining program of the cylinder head 200 based or the decided cutting direction and cutting amounts. The NC apparatus 24 cuts the mating surface 202 of the cylinder head 200 in accordance with the created machining program (S135).

As described above, the first embodiment can shorten the measurement time because the entire region of the recess and the surface shape of the mating surface around the recess need not be measured by the laser displacement meter in order to calculate the volume of the recess. Since the cutting amount and cutting direction of the mating surface are decided by fitting a design shape with respect to the measurement values of respective recesses, the volume of the combustion chamber can be adjusted with high accuracy.

Second Embodiment

In the second embodiment of the present invention, the cutting method and cutting amount of a mating surface 202 of a cylinder head 200 are decided by comparing measurement data 166 with three-dimensional shape data 168. The second embodiment is the same as the first embodiment in this regard, but is different from the first embodiment in the data comparison method. This will be explained in detail with reference to the drawings.

Figure 9B:
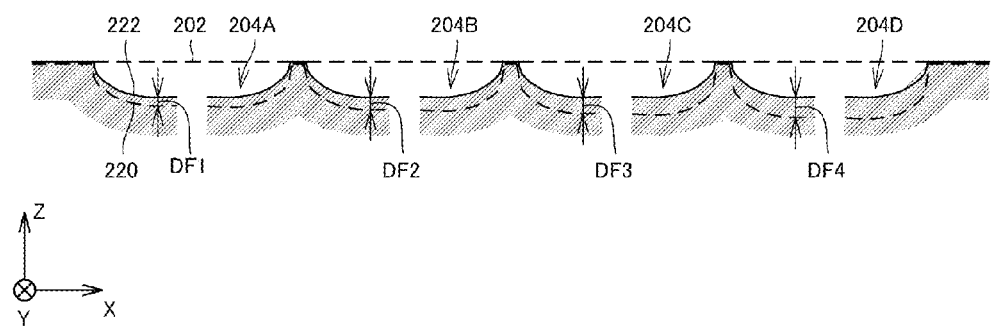
Figure 9C:
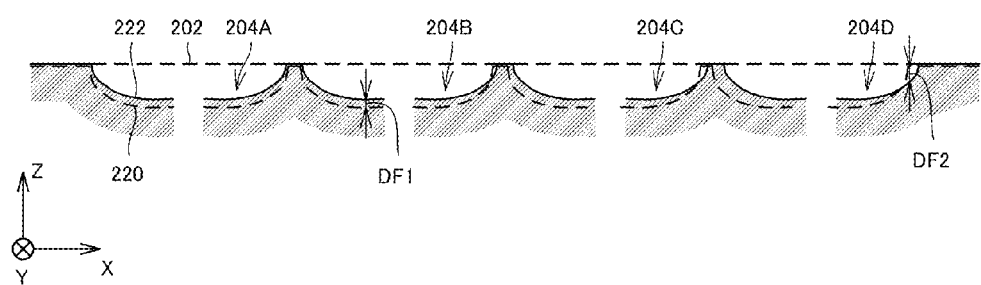

FIGS. 9A to 9C are sectional views for explaining a method of deciding the cutting amount and cutting direction of the mating surface of the cylinder head in the second embodiment. In FIGS. 9A to 9C, a broken line represents a surface shape based on each of measurement values 220, and a solid line represents a design shape 222 based ort the three-dimensional shape data 168.

Referring to FIG. 9A, first, a data processor 158 in FIG. 2 fits the design shape 222 of the mating surface 202 with respect to the respective measurement values 220 of the mating surface 202 by using the least squares method, maximum likelihood method, or the like. Then, the data processor 158 calculates differences DF between the respective measurement values 220 of recesses 204 and the design shapes 222 of the recesses 204 in this fitting state. In the case of FIG. 9A, the differences DF are uniform between the recesses 204, so a direction parallel to the mating surface 202 after casting serves as the cutting direction. The cutting amount is obtained by averaging the values of the calculated differences DF.

Referring to FIG. 9B, as a result of performing the same fitting as in FIG. 9A, obtained differences DF1 to DF4 gradually become larger in the array direction of the recesses 204. In this case, the cutting direction is decided in accordance with the tendency of a change of the differences DF1 to DF4. Hence, a direction inclined with respect to the mating surface 202 after casting serves as the cutting direction. Cutting amounts are decided based on the calculated differences DF, and have different values depending on positions on the mating surface.

In the case of FIG. 9B, if the cutting direction CD is not inclined with respect to the mating surface 202 after casting, the volumes of the recesses 204A to 204D after cutting differ from each other. By inclining the cutting direction with respect to the mating surface 202 after casting, the volumes of the recesses 204A to 204D after cutting become almost equal.

Referring to FIG. 9C, when the dispersion of difference values calculated for the respective recesses 204 is large as a result of performing the same fitting as in FIG. 9A, the data processor 158 determines that the cylinder head is a defective. For example, in the case of FIG. 9C, the difference DF1 of the recess 204B and the difference DF2 of the recess 204D have opposite signs.

FIG. 10 is a flowchart showing procedures of adjusting the volume of the combustion chamber of an engine in this embodiment.

Referring to FIGS. 2, 4, and 10, first, the cylinder head 200 formed by casting is placed on a table 18 of a machine tool 1 (S200). A-measurement controller 156 measures a plurality of portions of the surface by a laser displacement meter for the respective recesses 204 of the cylinder head 200, and measures a plurality of portions on the mating surface 202 of the cylinder head 200 by the laser displacement meter (S205). The measurement data 166 are stored in a memory 154.

Then, the data processor 158 fits the design shape of the mating surface 202 based on the three-dimensional shape data 168 with respect to the plurality of measurement values of the mating surface 202 (S210). The data processor 158 calculates differences between the respective measurement values, and the design shape based on the three-dimensional shape data 168, for the respective recesses 204 in this fitting state (S215). If the dispersion of the difference values calculated for the respective recesses 204 exceeds an allowable range (NO in S220), the data processor 158 determines that the cylinder head 200 is a defective (S225).

If the dispersion of the difference values for the respective recesses 204 falls within the allowable range (YES in S220), the data processor 158 decides the cutting direction of the mating surface 202 based on the tendency of a change of the calculated difference values in the array direction of the recesses 204A to 204D. Then, the data processor 158 decides cutting amounts at respective positions on the mating surface 202 based on the calculated difference values (or the average value of the difference values for the respective recesses) (S230).

Finally, a computer 150 creates the machining program of the cylinder head 200 based on the decided cutting direction and cutting amounts. An NC apparatus 24 cuts the mating surface 202 of the cylinder head 200 in accordance with the created machining program (S235).

As described above, the method according to the second embodiment can shorten the measurement time because the entire region of the recess and the surface shape of the mating surface around the recess need not be measured by the laser displacement meter in order to calculate the volume of the recess. Further, the differences between respective measurement values in the recesses and the design shape are calculated in a state in which the design shape is fitted with respect to the respective measurement values of the mating surface. Based on the calculated difference values, the cutting amount and cutting direction of the mating surface are decided. Therefore, the volume of the combustion chamber can be adjusted with high accuracy.

Third Embodiment

The third embodiment according to the present invention is different from the first and second embodiments in that a line laser displacement meter configured to emit a line-shaped laser beam is used. In FIG. 3 which is a view showing the arrangement of the laser displacement meter, the lens 114 of the light emitter 110 is replaced with, for example, a cylindrical lens in the case of the line laser displacement meter. In this arrangement, the light emitter emits a line-shaped laser beam. As a light receiver 120, a two-dimensional image sensor is used instead of the linear image sensor.

FIGS. 11A and 11B are views for explaining the measurement principle of the line laser displacement meter. As shown in FIG. 11A, a measurement target object 2 is irradiated with a band-shaped (line-shaped) laser beam 116A from a light emitter 110A. The light scattered by the measurement target object 2 is condensed through a light receiving lens 118 into not a spot shape but a line shape on a two-dimensional image sensor 122 arranged on the light receiver 120. Hence, the triangulation is expanded in the direction of width (Y-axis direction), and displacements in the Z-axis direction at respective laser irradiation positions in the Y-axis direction can be simultaneously detected.

FIG. 12 is a view for explaining the measurement portions of the surface of a cylinder head by the line laser displacement meter. By scanning a line-shaped laser beam, the surface shapes of the entire regions of respective recesses 204 in FIG. 4, and the surface shape of a mating surface 202 around the respective recesses 204 can be measured in a relatively short time. More specifically, FIG. 12 shows a recess 204C and measurement points around it. Each lattice point is equivalent to a measurement point by the line laser displacement meter. The number of measurement points depends on the number of pixels of the two-dimensional image sensor.

By comparing three-dimensional shape data (design data) and measurement data, data of regions equivalent to openings 206A and 206B for intake ports, openings 208A and 208B for exhaust ports, and openings 210 for spark plugs are removed from the measurement data (in FIG. 12, measurement data are not removed from dotted lattice points MP, but measurement data are removed from undotted lattice points MP). This is because the reflection direction of a laser beam varies at these opening portions and the reliability of measurement data is poor. At these opening portions, pieces of position information of the intake valves, exhaust valves, and spark plugs on the surface are used. Finally, the volumes of the respective recesses 204 are calculated using measurement data modified in the above-described manner.

Figure 13:
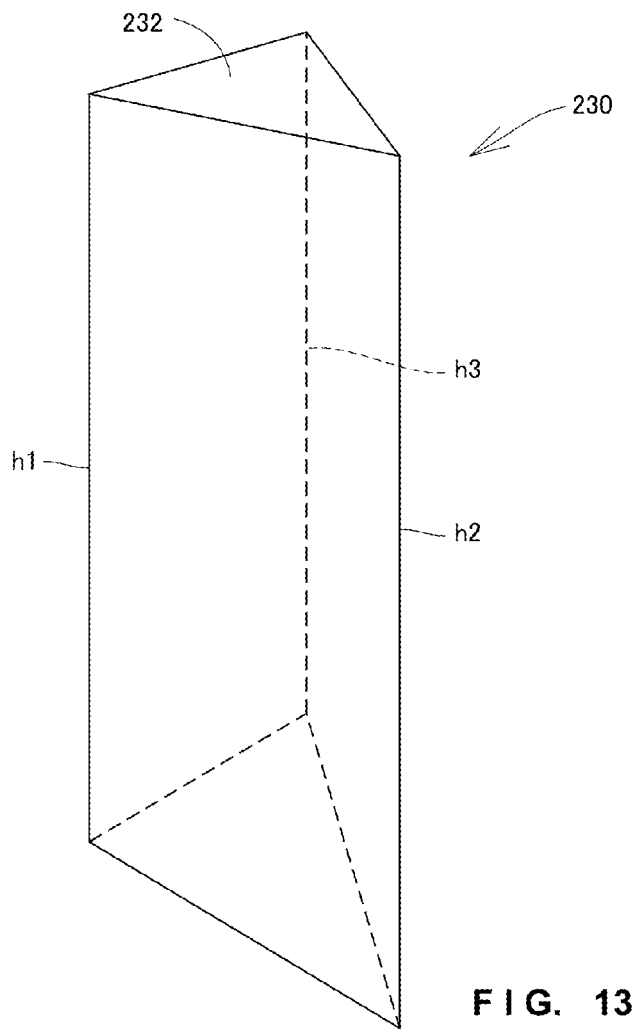
FIG. 13 is a view for explaining a method of calculating the volume of each recess.

FIG. 13 is a view for explaining a method of calculating the volume of each recess. Referring to FIGS. 12 and 13, the volume of the recess 204 can be calculated by dividing a region surrounded by the recess 204 into many truncated triangle poles as shown in FIG. 13, and adding the volumes of the respective truncated triangle poles. A bottom surface 232 of the truncated triangle pole is equivalent to half of each square region partitioned by the lattice in FIG. 12, and is positioned on the extension of the mating surface 202 of the cylinder head 200. Heights h1, h2, and h3 of the truncated triangle pole are equivalent to distances from respective vertices constituting the bottom surface 232 to the surface of the recess 204.

Figure 14:
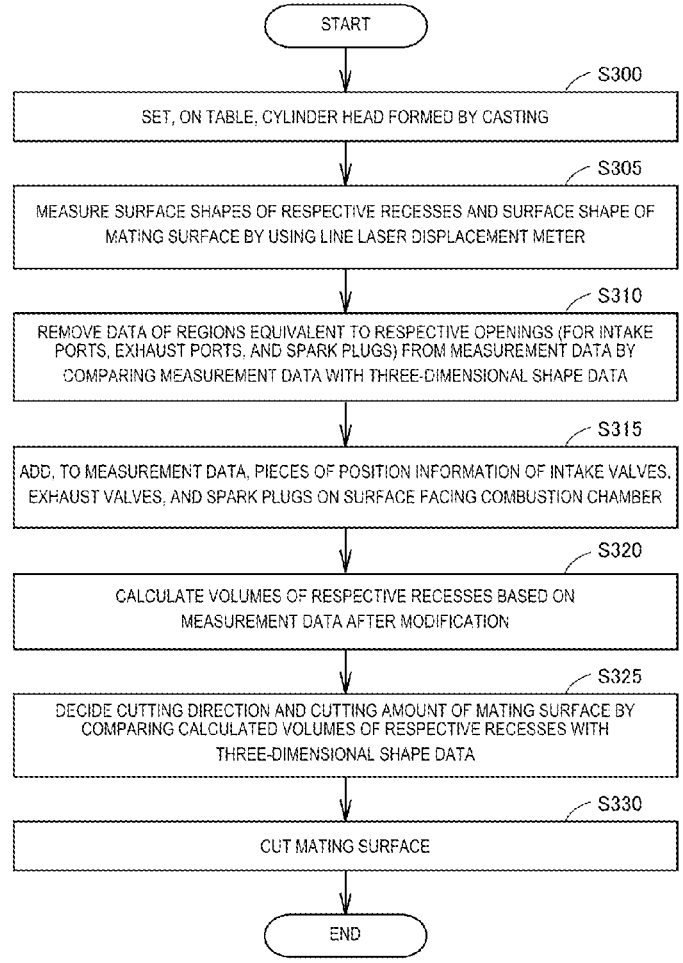
FIG. 14 is a flowchart showing procedures of adjusting the volume of the combustion chamber of an engine according to the third embodiment of the present invention.

FIG. 14 is a flowchart showing procedures of adjusting the volume of the combustion chamber of an engine.

Referring to FIGS. 2, 4, and 14, first, the cylinder head 200 formed by casting is placed on a table 18 of a machine tool 1 (S300). A measurement controller 156 measures the surface shapes of the respective recesses 204 of the cylinder head 200 and the surface shape of the mating surface 202 by using the line laser displacement meter (S305). Measurement data 166 are stored in a memory 154.

Then, a data processor 158 removes data of regions equivalent to the openings (for the intake ports, exhaust ports, and spark plugs) from the measurement data by comparing the measurement data 166 and three-dimensional shape data 168 (S310). Pieces of position information of a surface facing the combustion chamber on the assumption that the intake valves, exhaust valves, and spark plugs are attached to corresponding openings are added to these regions (S315).

After that, the data processor 158 calculates the volumes of the respective recesses 204 based on the measurement data 166 after modification (S320). The data processor 158 decides the cutting direction and cutting amount of the mating surface by comparing the calculated volumes of the respective recesses 204 with the volumes of the respective recesses 204 based on the three-dimensional shape data 168 (S325).

For example, when the calculated volumes of the recesses 204 change in the array direction of the recesses 204A to 204D, the data processor 158 decides the cutting directions of the respective recesses based on the tendency of a change of the volumes so that the volumes of the respective recesses 204 after cutting become equal.

Finally, a computer 150 creates the machining program of the cylinder head 200 based on the decided cutting direction and cutting amounts. An NC apparatus 24 cuts the mating surface 202 of the cylinder head 200 in accordance with the created machining program (S335).

As described above, the third embodiment can shorten the measurement time because the surface shapes of the recesses and mating surface are measured using the line laser displacement meter. Further, the volumes of the respective recesses 204 are calculated based on measurement data, and the cutting amount and cutting direction of the mating surface are decided based on the calculated volumes of the respective recesses 204. Thus, the volume of the combustion chamber can be adjusted with high accuracy.

Other Embodiments

It should be considered that the above embodiments are exemplary and are not restrictive in every regard. The scope of the present invention is defined not by the above description but by the scope of the claims, and is intended to include all changes without departing from meanings and a scope equivalent to the scope of the claims.

For example, a method for adjusting the volume of the combustion chamber of an engine comprises preparing a cylinder head formed by casting. The cylinder head includes a recess constituting part of the combustion chamber of the engine and a mating surface for a cylinder block. The mating surface is formed to have a cutting stock with respect to three-dimensional shape data of the cylinder head designed to have a target combustion chamber volume. The adjusting method further comprises measuring a plurality of portions of the surface of the recess and a plurality of portions of the mating surface by using a displacement meter, calculating differences between the respective measurement values of the mating surface, and a design shape of the mating surface based on the three-dimensional shape data in a state in which the design shape of the surface of the recess based on the three-dimensional shape data is fitted with respect to a plurality of measurement values of the recess, and deciding a cutting amount based on the calculated differences and cutting the mating surface by the decided cutting amount.

The cylinder head includes a plurality of recesses arrayed in line. In this case, in the measuring, a plurality of portions of the surface are measured by the displacement meter for the respective recesses. In the cutting, the cutting direction of the mating surface is further decided based on the tendency of a change of the values of the calculated differences in the array direction of the recesses, and the mating surface is cut by the decided cutting amount in the decided cutting direction.

The cylinder head includes a plurality of recesses. In this case, in the measuring, a plurality of portions of the surface are measured by the displacement meter for the respective recesses. The adjusting method further comprises calculating differences between a plurality of measurement values of a second recess different from an arbitrary first recess out of the plurality of recesses, and the design shape of the surface of the second recess based on the three-dimensional shape data in a state in which the design shape of the surface of the first recess based on the three-dimensional shape data is fitted with respect to a plurality of measurement values of the arbitrary first recess, and determining based on the calculated differences of the second recess whether the cylinder head is a non-defective.

This method can shorten the measurement time because the entire region of the recess and the surface shape of the mating surface around the recess need not be measured by the laser displacement meter in order to calculate the volume of the recess. Since the cutting amount and cutting direction of the mating surface are decided by fitting a design shape with respect to the measurement values of respective recesses, the volume of the combustion chamber can be adjusted with high accuracy.

A method for adjusting the volume of the combustion chamber of an engine comprises preparing a cylinder head formed by casting. The cylinder head includes a recess constituting part of the combustion chamber of the engine and a mating surface for a cylinder block. The mating surface is formed to have a cutting stock with respect to three-dimensional shape data of the cylinder head designed to have a target combustion chamber volume. The adjusting method further comprises measuring a plurality of portions of the surface of the recess and a plurality of portions of the mating surface by using a displacement meter, calculating differences between the respective measurement values of the recess, and the design shape of the surface of the recess based on the three-dimensional shape data in a state in which the design shape of the mating surface based on the three-dimensional shape data is fitted with respect to a plurality of measurement values of the mating surface, and deciding a cutting amount based on the calculated differences and cutting the mating surface by the decided cutting amount.

In one preferred embodiment, the cylinder head includes a plurality of recesses arrayed in line. In this case, in the measuring, a plurality of portions of the surface are measured by the displacement meter for the respective recesses. In the calculating the differences, differences between respective measurement values, and the design shape based on the three-dimensional shape data are calculated for the respective recesses. In the cutting, the cutting direction of the mating surface is further decided based on the tendency of a change of the values of the calculated differences in the array direction of the recesses, and the mating surface is cut by the decided cutting amount in the decided cutting direction.

In another preferred embodiment, the cylinder head includes a plurality of recesses. In this case, in the measuring, a plurality of portions of the surface are measured by the displacement meter for the respective recesses. In the calculating the differences, differences between respective measurement values, and the design shape based on the three-dimensional shape data are calculated for the respective recesses. The adjusting method further comprises comparing the values of the differences calculated for the respective recesses to determine whether the cylinder heads is a non-defective.

In another preferred embodiment, the adjusting method further comprises calculating the average value of the differences between the respective, measurement values of the recess, and the design shape of the surface of the recess based on the three-dimensional shape data. In this case, in the cutting, the cutting amount is decided based on the calculated average value of the differences, and the mating surface is cut by the decided cutting amount.

The method for adjusting the volume of the combustion chamber of an engine according to the other aspect can shorten the measurement time because the entire region of the recess and the surface shape of the mating surface around the recess need not be measured by the laser displacement meter in order to calculate the volume of the recess. Further, the differences between respective measurement values in the recesses and the design shape are calculated in a state in which the design shape is fitted with respect to the respective measurement values of the mating surface. Based on the calculated difference values, the cutting amount and cutting direction of the mating surface are decided. Therefore, the volume of the combustion chamber can be adjusted with high accuracy.

In still another aspect, the method for adjusting the volume of the combustion chamber of an engine comprises preparing a cylinder head formed by casting. The cylinder head includes a recess constituting part of the combustion chamber of the engine and a mating surface for a cylinder block. The recess includes a plurality of openings to which a plurality of specific members are attached respectively. The mating surface is formed to have a cutting stock with respect to three-dimensional shape data of the cylinder head designed to have a target combustion chamber volume. The adjusting method further comprises measuring the surface shape of the recess and the shape of the mating surface around the recess by successively changing the irradiation position of a laser beam using a line laser displacement meter configured to emit a line-shaped laser beam, removing data of regions equivalent to the plurality of openings from measurement data by comparing the measurement data obtained by the line laser displacement meter with the three-dimensional shape data, calculating the volume of the recess based on the measurement data from which the regions equivalent to the plurality of openings are removed, deciding the cutting amount of the mating surface by comparing the calculated volume of the recess with a volume of the recess based on the three-dimensional shape data, and cutting the mating surface by the decided cutting amount.

The adjusting method may further comprise, after removing the data of the regions equivalent to the plurality of openings from the measurement data, adding, to the measurement data, pieces of position information of the plurality of specific members on a surface facing the combustion chamber on the assumption that the plurality of specific members are attached to the plurality of openings, respectively. In this case, in the calculating the volume, the volume of the recess is calculated based on the measurement data to which the pieces of position information of the plurality of specific members on the surface are added.

Further, the cylinder head may include a plurality of recesses arrayed in line. In this case, in the measuring, the surface shape and the shape of the mating surface around the recess are measured by the line laser displacement meter for each recess. In the calculating the volume, the volume is calculated for each recess. The adjusting method further comprises deciding the cutting direction of the mating surface to equalize the volumes of the respective recesses after cutting based on the tendency of a change of the values of the calculated volumes in the array direction of the recesses. In the cutting, the mating surface is cut by the decided cutting amount in the decided cutting direction.

This adjusting method can shorten the measurement time because the surface shapes of the recess and mating surface are measured using the line laser displacement meter. Further, the volumes of the respective recesses 204 are calculated based on measurement data, and the cutting amount and cutting direction of the mating surface are decided based on the calculated volumes of the respective recesses 204. Thus, the volume of the combustion chamber can be adjusted with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-62491 filed on Mar. 25, 2014, which is hereby incorporated by reference herein in its entirety.

What is claimed is:

1. A method for adjusting a volume of a combustion chamber of an engine, comprising:
    preparing a cylinder head formed by casting,
    the cylinder head including a recess constituting part of the combustion chamber of the engine and a mating surface for a cylinder block,
    the recess including a plurality of openings to which a plurality of specific members are attached respectively, and
    the mating surface being formed to have a cutting stock with respect to three-dimensional shape data of the cylinder head designed to have a target combustion chamber volume,
    the adjusting method further comprising:
    measuring a surface shape of the recess and a shape of the mating surface around the recess by successively changing an irradiation position of a laser beam using a line laser displacement meter configured to emit a line-shaped laser beam;
    removing data of regions equivalent to the plurality of openings from measurement data by comparing the measurement data obtained by the line laser displacement meter with the three-dimensional shape data;
    after removing the data of the regions equivalent to the plurality of openings from the measurement data, adding to the measurement data, pieces of position information of the plurality of specific members on a surface facing the combustion chamber on the assumption that the plurality of specific members are attached to the plurality of openings, respectively;
    calculating a volume of the recess based on the measurement data from which the regions equivalent to the plurality of openings are removed;
    deciding a cutting amount of the mating surface by comparing the calculated volume of the recess with a volume of the recess based on the three-dimensional shape data; and
    cutting the mating surface by the decided cutting amount.

2. A method for adjusting a volume of a combustion chamber of an engine, comprising:
    preparing a cylinder head formed by casting,
    the cylinder head including a recess constituting part of the combustion chamber of the engine and a mating surface for a cylinder block,
    the recess including a plurality of openings to which a plurality of specific members are attached respectively, and
    the mating surface being formed to have a cutting stock with respect to three-dimensional shape data of the cylinder head designed to have a target combustion chamber volume,
    the adjusting method further comprising:
    measuring a surface shape of the recess and a shape of the mating surface around the recess by successively changing an irradiation position of a laser beam using a line laser displacement meter configured to emit a line-shaped laser beam;
    removing data of regions equivalent to the plurality of openings from measurement data by comparing the measurement data obtained by the line laser displacement meter with the three-dimensional shape data;

calculating a volume of the recess based on the measurement data from which the regions equivalent to the plurality of openings are removed;
deciding a cutting amount of the mating surface by comparing the calculated volume of the recess with a volume of the recess based on the three-dimensional shape data; and
cutting the mating surface by the decided cutting amount,
wherein the cylinder head includes a plurality of recesses arrayed in a line,
wherein, in the measuring, the surface shape and the shape pf the mating surface around the recess are measured by the line laser displacement meter for each recess,
wherein, in calculating the volume, the volume is calculated for each recess,
wherein, the adjusting method further comprises deciding a cutting direction of the mating surface to equalize volumes of the respective recesses after cutting based on tendency of a change of values of the calculated volumes in an array direction of the recesses, and
wherein, in the cutting, the mating surface is cut by the decided cutting amount in the decided cutting direction.

* * * * *